April 14, 1953 F. B. BURT 2,634,624
STEERING GEAR CONSTRUCTION
Filed Oct. 26, 1949
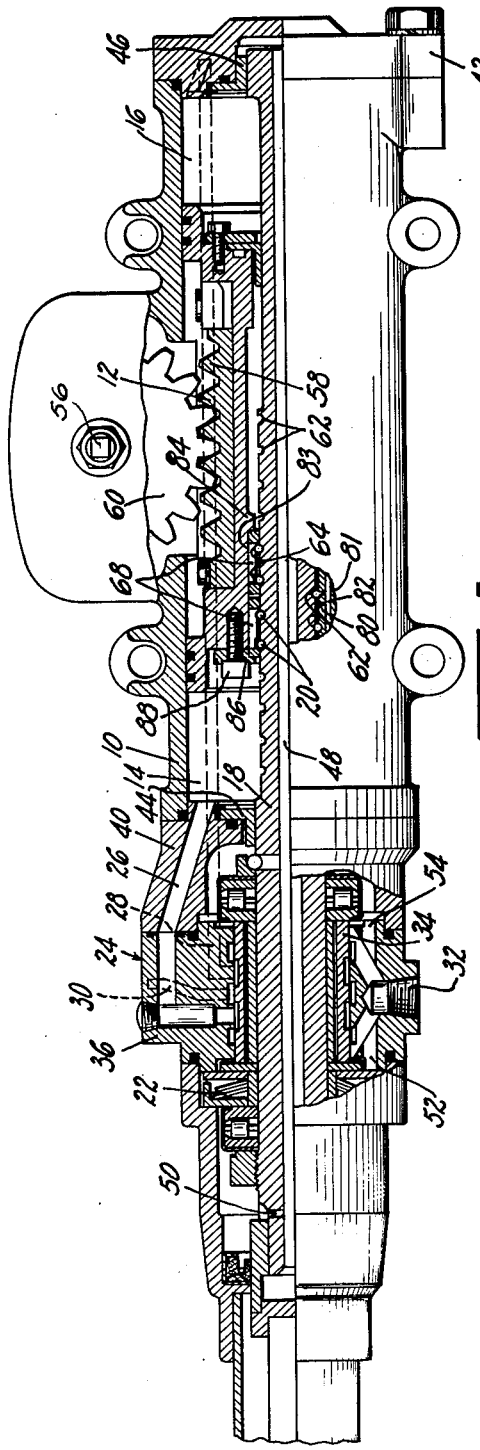
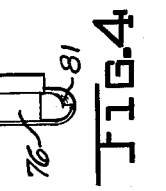
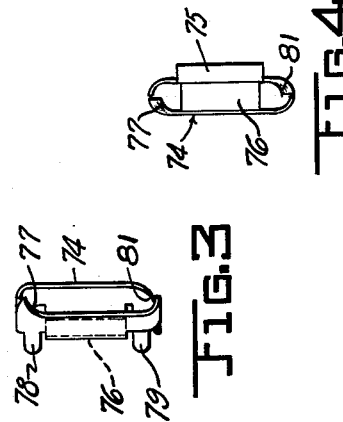
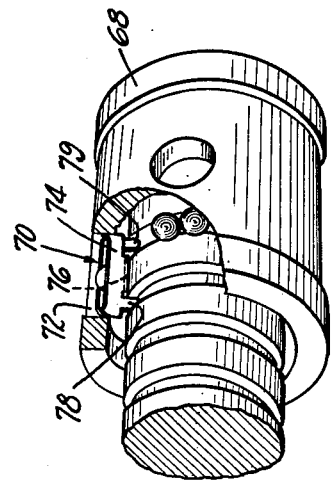
INVENTOR.
FARLOW B. BURT
BY Cecil J Arens
ATTORNEY Patented Apr. 14, 1953

2,634,624

UNITED STATES PATENT OFFICE 2,634,624

STEERING GEAR CONSTRUCTION

Farlow B. Burt, South Bend, Ind., assignor to Bendix Aviation Corporation, South Bend, Ind., a corporation of Delaware Application October 26, 1949, Serial No. 123,627

6 Claims. (Cl. 74—459)

This invention relates to steering gear construction and more particularly to screw and nut gears of the type wherein the screw and nut are provided with corresponding helical grooves for receiving balls which constitute force transmitting members between the screw and nut, and in which said balls are preloaded by adjusting said nut axially.

It is an important object of the invention to provide novel means for preloading the balls in a screw and nut construction of the above mentioned design.

Another important object of the invention resides in the provision of a ballnut and screw construction wherein two axially adjustable nuts are provided for movement in opposite directions to preload the balls, thus minimizing backlash.

A further object of the invention resides in the provision of novel means in a worm and ballnut steering gear for confining the balls to a single helical groove of the worm and nut.

The above and other objects and features of the invention may be apparent from the following description taken in connection with the accompanying drawing which forms a part of this specification and in which:

Figure 1 is a longitudinal sectional view of one form of steering mechanism with which the invention is associated;

Figure 2 is a view in perspective of the worm and ballnut;

Figure 3 is a view in perspective of the shunt element for redirecting the balls across the worm crest to the adjacent groove; and Figure 4 is a modified form of the shunt element.

Referring now to Figure 1 of the drawing in which the invention is illustrated in connection with a steering mechanism, the reference numeral 10 designates a housing or motor cylinder in which a nut member or piston 12 is positioned for axial displacement within the cylinder. The nut member or piston 12 divides the cylinder into opposed chambers 14 and 16. Axial displacement of the nut member may be accomplished through rotation of a shaft or worm 18 which extends through the piston and housing and which is drivably connected to the nut member through a plurality of force transmitting members or balls 20. The rotative action of the shaft is translated into an axial force on the nut to thereby move the piston to the right or left depending upon the direction of rotation of the shaft. This piston movement is augmented by fluid under pressure from a source, not shown, acting in one or the other of chambers 14 and 16, when the resistance offered to turning the shaft 18 exceeds a predetermined value determined by the strength of a spring 22. The spring normally holds an open center valve 24 in the position shown to thereby admit fluid pressure simultaneously to the chambers 14 and 16 through the passages 26 and 28 respectively. Since the effective areas of the ends of the nut member 12 exposed to fluid under pressure are the same there is no movement of the piston at this time when equal pressures are acting on its ends. The valve is furnished with inlet and outlet passages 30 and 32 communicating with the interior of the valve. The deflection of the spring 22, when the resistance offered to steering exceeds a predetermined value, permits a valve spool 34 to move axially relative to body member 36 so that one of the passages 26 and 28 is restricted to inlet pressure and opened wider to exhaust pressure and the other of the passages is restricted to exhaust pressure and opened wider to inlet pressure. That is, the reaction to the turning effort is taken in the shaft, whereby axial displacement of the valve 24 is accomplished. Since this valve and its function forms no part of the present invention reference is made to Patent No. 1,790,620 for a more detailed discussion of the operation of an open center type valve.

The housing 10 is equipped with end covers 40 and 42 which support bushings 44 and 46 respectively and in which the shaft 18 rotates. The shaft is provided with a longitudinal bore 48 for equalizing the pressures acting on the ends of the shaft. This longitudinal bore communicates with the exhaust port 32 through a radial passage 50 of the shaft and passage 52 in the valve body. A passage 54 in the valve body communicates the right end of the valve body 24 to the exhaust port.

The nut member or piston is drivably connected to a rockshaft 56 in a manner to be hereinafter described. A rack 58 is carried by the nut member and meshes with a gear sector 60 securely mounted on the rockshaft.

In order to provide a relatively frictionless driving connection between the shaft or screw 18 and the nut member or piston 12, the screw is equipped with a helical groove 62 and the nut member is furnished with a helical groove 64 corresponding with the helical groove of the screw to thereby form a helical channel into which the balls 20 are inserted. In worm and ballnut assemblies of the type herein disclosed the channel is connected at its ends for recirculating the balls. The length of this channel may be one helix or several helices. In the present disclosure the balls are circulated through a channel approximately one helix in length. The groove 64 is formed in a sleeve or nut 68, of which there are two, suitably positioned in the nut member. These sleeve elements in which the grooves 64 are formed, are securely fixed to the nut member in a manner hereinafter described. This construction is conducive to a reduction in the manufacturing cost of the complete assembly. That is, as against forming the groove 64 in the piston or nut member per se it is much cheaper to form this groove in the sleeve or nut 68 and then securely attach the same to the piston so as to become an integral part thereof. Only one of the nuts 68 will be described in detail since they are alike structurally. A shunt 70 joins adjacent grooves in a manner such that the channel of balls forms substantially one complete helix around the screw. This shunt is formed in the nut 68 and comprises a slot or passage 72 into which an integrated shunt member 74 is inserted for diverting the balls from one end of the helix to the other end. The shunt member 74 is formed with a bridge 76 over which the balls ride out of contact with the worm crest when being returned to the adjacent channel. Scoops 78 and 79 are contiguous the ends of the bridge and protrude into the grooves of the screw so as to actually lift the balls onto the bridge. These scoops are formed to face in opposite directions in order to lift the balls out of the grooves regardless of the direction of rotation of the screw. Guiding surfaces 77 and 81 are located at each end of the bridge above the scoops 78 and 79 respectively for directing the balls downwardly onto the bridge when rotation of the shaft is in one direction and for deflecting the balls off the bridge into the helical groove when rotation of the shaft is in the other direction. When the nut is used as shown in Figure 1, that is inserted into a bore 83 of the nut member or piston, the latter forms a top for the passage 72, so as to confine the balls within the shunt member, when said balls pass from one end of the helix to the other. However, when the nut is not used in this manner any suitable covering over the passage will suffice, such for example, as a cover 75 formed integrally with the shunt member 74. See Figure 4 for modification, in which the cover is bent back for inserting the balls. The construction herein disclosed for shunting the balls as aforesaid is believed to be novel and forms a part of this invention.

In any screw and nut construction it is always desirable to keep backlash to a minimum. With the use of a ballnut and screw arrangement the most common way for reducing backlash is to preload the balls radially. The construction of the mechanism for radial loading of the balls is more expensive and the number of balls in the ballnut must be increased beyond that required in the present invention because a fewer number of the balls are actually working.

It is a further purpose of this invention to provide means for preloading the balls of the nut member axially to thereby reduce backlash. The two nuts 68, one of which comes into action for each direction of rotation of the shaft 18, are threaded onto the screw 18 and the nut member or piston slid thereover so that the nuts are housed in the bore 83. The nuts 68 and bore 83 are provided with axially milled slots 80 and 81 for receiving a key 82. The inner end of the bore 83 is formed with a reduced section 84 against which one of the nuts 68 abuts. The other nut, which is adjacent the open end of the bore, has its outer end in contact with a collar 86 adjustably supported on the nut member with bolts 88. Tightening these bolts will urge the nut on the right to the left and the nut on the left to the right, thus removing the backlash. It will be noted that the nuts are urged or preloaded in opposite directions, which means that backlash is entirely eliminated regardless of the direction of rotation of the screw or shaft 18. For one direction of rotation of the shaft 18 the load is transferred to the rockshaft through one of the nuts and for the reverse direction of rotation of the shaft 18 the load is transferred to the rockshaft via the other nut. Preloading the balls axially as hereinbefore explained causes all the balls disposed in the nuts except those in the shunt to be urged against the groove in the worm and the corresponding groove in the screw so that the load is distributed proportionally amongst all the balls from one end of the helical channel to the other end. That is, each of the balls in the two circuits, exclusive of those in the shunt, carries its share of the load.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. Screw and nut mechanism comprising a nut with a helical groove therein, a screw in the nut with a helical groove corresponding to the groove in the nut and together therewith forming a helical channel, a plurality of balls in the channnel between the screw and nut and arranged side by side so as to substantially fill the channel, a passage in the nut connecting adjacent channels of the helix, a shunt member of unitary construction arranged in the passage to provide an endless track for recirculating the balls said shunt member including scoops protruding into the grooves of said screw for redirecting the balls across said shunt member into the adjacent channel, and a bridge over which the balls roll in passing between adjacent channels, said scoops being formed to deflect the balls radially from the channel for deposit on said bridge.

2. In combination, a shaft with an external helical groove in its surface, a nut member provided with a longitudinal bore for receiving the shaft, a shoulder formed in the bore, a pair of nuts disposed in the bore and having internal helical grooves mating with the grooves in said shaft, balls engageable in the grooves of said shaft and nuts, a ring element located at one end of the nut member, said nuts being located in the bore between said shoulder and ring element, and means associated with the ring element for urging said shoulder against one end of one of said nuts and for urging said ring element against the opposite end of the other of said nuts, whereby said nuts are preloaded in opposite directions.

3. In combination, a shaft with an external helical groove in its surface, a nut member provided with a longitudinal bore for receiving the shaft, a shoulder formed in the bore, a pair of nuts disposed end to end in the bore and having internal helical grooves mating with the grooves in said shaft, balls engageable in the grooves of said shaft and nuts, a ring element located at one end of the nut member, said nuts being located in the bore between said shoulder and ring element, axially extending splines in the nut member and nuts, keys in the splines for preventing relative rotation between the nut member and nuts but permitting relative axial movement therebetween, and means associated with the ring element for urging said shoulder against one end of one of said nuts and for urging said ring element against the opposite end of the other nut.

4. A non-friction screw and nut assembly comprising, in combination, a shaft with an external groove in its surface, a pair of nuts, each provided with internal grooves mating with the grooves in the shaft, balls engageable in the grooves of the shaft and nuts, a member arranged concentrically of said shaft to be moved therealong and provided with an opening for receiving said two nuts, an abutment in the opening against which one end of one of the nuts rests, the other nut having one of its ends disposed adjacent the other end of said one nut, an adjustable abutment arranged with respect to the opening to engage the other end of said other nut, and means carried by said member for urging said first mentioned abutment against one end of said one nut and for urging said second mentioned abutment against said other end of said other nut so as to preload said balls.

5. In a screw and nut assembly, a screw having threads thereon, a nut having threads therein for mating with the threads of the screw, a plurality of balls in the mating threads of the screw and nut, said nut having an opening in its wall to provide a passage for connecting two threads, an integrated shunt member insertable into said passage through said opening and arranged in the passage to permit recirculation of the balls between the two threads, said shunt member including two scoops, one for each of said threads and projecting respectively thereinto for redirecting the balls across said shunt, a bridge over which the balls roll in passing between said two threads, and guiding surfaces located adjacent the ends of the bridge for deflecting the balls onto one end and off the other end of said bridge.

6. A non-friction screw and nut assembly comprising, in combination, a shaft provided with a threaded portion, a pair of nuts, each provided with threads which are in mating relationship to the threads on the shaft, balls arranged in the mating threads of the shaft and nuts, a nut member arranged concentrically of the shaft and drivably related to the nuts so as to be moved along the shaft in response to shaft rotation, said nut member being provided with two abutments spaced apart axially along said shaft, said nuts being arranged between said abutments and in engaging relationship thereto, and means carried by said nut member for shifting said nuts axially along said shaft to thereby preload the balls.

FARLOW B. BURT.

References Cited in the file of this patent

UNITED STATES PATENTS

| Number | Name | Date |
|---|---|---|
| 992,897 | Nichols et al. | May 23, 1911 |
| 1,239,193 | Lindner | Sept. 4, 1917 |
| 1,500,270 | Rodel | July 8, 1924 |
| 2,441,168 | Richardson | May 11, 1948 |
| 2,455,368 | Hoffar | Dec. 7, 1948 |
| 2,508,261 | Hosler | May 16, 1950 |